(12) United States Patent
Esch et al.

(10) Patent No.: US 9,258,771 B2
(45) Date of Patent: Feb. 9, 2016

(54) RADIO COMMUNICATION DEVICES AND METHODS FOR CONTROLLING A RADIO COMMUNICATION DEVICE

(71) Applicant: Intel Mobile Communications GmbH, Neubiberg (DE)

(72) Inventors: Michael Esch, Nuremberg (DE); Michael Neuwert, Stein (DE); Kumaran Subramanian, Nuremberg (DE); Dirk Nickisch, Neubiberg (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 34 days.

(21) Appl. No.: 13/776,804

(22) Filed: Feb. 26, 2013

(65) Prior Publication Data

US 2014/0242987 A1     Aug. 28, 2014

(51) Int. Cl.
*H04W 36/30* (2009.01)
*H04W 48/20* (2009.01)
*H04W 48/16* (2009.01)

(52) U.S. Cl.
CPC .............. *H04W 48/20* (2013.01); *H04W 48/16* (2013.01)

(58) Field of Classification Search
CPC ..... H04W 48/10; H04W 48/12; H04W 48/16; H04W 48/18
USPC .................................. 455/436, 434; 370/328
See application file for complete search history.

(56) References Cited

U.S. PATENT DOCUMENTS

| 6,226,271 | B1* | 5/2001 | Dent .............................. 370/252 |
| 7,366,475 | B2* | 4/2008 | Ramesh ...................... 455/67.13 |
| 2005/0272375 | A1* | 12/2005 | Ramesh ....................... 455/67.11 |
| 2008/0220784 | A1* | 9/2008 | Somasundaram et al. ..... 455/437 |
| 2010/0316000 | A1* | 12/2010 | Burbidge et al. ............. 370/328 |
| 2011/0117911 | A1* | 5/2011 | Narang et al. ................ 455/434 |
| 2012/0039424 | A1* | 2/2012 | Ferchland et al. ............. 375/343 |
| 2012/0322446 | A1* | 12/2012 | Ramachandran et al. ..... 455/436 |
| 2014/0242993 | A1* | 8/2014 | Dahlen et al. ................. 455/436 |

OTHER PUBLICATIONS

3GPP TS 45.008 V10.3.0, 3rd Generation Partnership Project; Technical Specification Group GSM/EDGE Radio Access Network; Radio subsystem link control (Release 10), Nov. 2011, sec 6.4, pp. 20-21.

(Continued)

*Primary Examiner* — William Nealon

(57) ABSTRACT

A radio communication device may be provided. The radio communication device may include: a measurement circuit configured to measure a reception quality of a signal from a second radio communication device; a memory configured to store signal information indicating the reception quality of the signal measured by the measurement circuit; a configuration information receiver configured to receive configuration information for the radio communication device based on the measured reception quality; a quality indication determination circuit configured to determine a quality indication of a communication with the second radio communication device based on the stored signal information and the received configuration information; and a connection establishing determination circuit configured to determine whether to establish a connection for communication with the second radio communication device based on the determined quality indication.

29 Claims, 6 Drawing Sheets

(56) References Cited

OTHER PUBLICATIONS

3GPP TS 44.018 V10.5.0, 3rd Generation Partnership Project; Technical Specification Group GSM/EDGE Radio Access Network; Mobile radio interface layer 3 specification; Radio Resourse Control (RRC) protocol (Release 10), Dec. 2011, sec 9.1.35, 9.1.36, 10.5.2.4, pp. 200-202, 259-261.

3GPP TS 43.022 V10.0.0, 3rd Generation Partnership Project; Technical Specification Group GSM/EDGE Radio Access Network; Functions related to Mobile Station (MS) in idle mode and group receive mode (Release 10), Mar. 2011, sec 3.6, pp. 11-12.

3GPP TS 45.002 V11.1.0, 3rd Generation Partnership Project; Technical Specification Group GSM/EDGE Radio Access Network; Multiplexing and multiple access on the radio path (Release 11), Nov. 2012, sec 6.3.1.3, pp. 35-37.

\* cited by examiner

RADIO COMMUNICATION DEVICES AND METHODS FOR CONTROLLING A RADIO COMMUNICATION DEVICE

TECHNICAL FIELD

Aspects of this disclosure relate generally to radio communication devices and methods for controlling a radio communication device.

BACKGROUND

The detection of cells belonging to a GSM (Global System for Mobile Communications) cellular network may follow a four steps approach. First the mobile station may perform signal strength measurements (for example RSSI (Received Signal Strength Indication) or RXLEV (Reception Level)) on defined frequency carriers. Second it may start searching the Frequency Correction Burst (FCB) on the carriers with the highest signal strength. Third, after an FCB has been found, the mobile station may be able to calculate the position of the Synchronization Burst (SB) and receive it. Fourth, the SB may include the cell identifier and the training sequence code needed to receive the System Information blocks containing the cell configuration.

Based on the cell configuration, the Mobile Station may detect if the cell belongs to the correct GSM network and get the parameters to calculate the C2 value according to 3GPP TS 45.008 sec. 6.4 needed to consider about re-selection to the new cell based on the actual signal strength of the cell.

The Mobile Station may re-select to a new cell if its C2 values is higher than the C2value of the cell the Mobile Station is currently camping on for (for example) at minimum five seconds. Goal of this process is that the Mobile Station is camping on the cell with the highest C2 value belonging to the selected PLMN (Public Land Mobile Network) or an equivalent PLMN and fulfilling the condition for C2.

However, it may take time to find the FCB, receive the SB and the System Information blocks and this time may delay the re-selection of the Mobile Station to a new "best suitable cell" which may lead into a higher rate of cell re-selections or even into a higher rate of cell losses (for example out-of coverage events) and a lower mobile terminated call setup success rate in a fast moving environment. Thus, it may be desired to decrease the time needed to perform the re-selection.

SUMMARY

A radio communication device may include: a measurement circuit configured to measure a reception quality of a signal from a second radio communication device; a memory configured to store signal information indicating the reception quality of the signal measured by the measurement circuit; a configuration information receiver configured to receive configuration information for the radio communication device based on the measured reception quality; a quality indication determination circuit configured to determine a quality indication of a communication with the second radio communication device based on the stored signal information and the received configuration information; and a connection establishing determination circuit configured to determine whether to establish a connection for communication with the second radio communication device based on the determined quality indication.

A method for controlling a radio communication device may include: measuring a reception quality of a signal from a second radio communication device; storing signal information indicating the reception quality of the signal measured by the measurement circuit; receiving configuration information for the radio communication device based on the measured reception quality; determining a quality indication of a communication with the second radio communication device based on the stored signal information and the received configuration information; and determining whether to establish a connection for communication with the second radio communication device based on the determined quality indication.

A radio communication device may include: a memory configured to store signal information indicating a measured reception quality of a signal from a second radio communication device; a configuration information receiver configured to receive configuration information for the radio communication device based on the measured reception quality; and a connection establishing determination circuit configured to determine whether to establish a connection for communication with the second radio communication device based on the stored signal information and the received configuration information.

A method for controlling a radio communication device may include: storing signal information indicating a measured reception quality of a signal from a second radio communication device; receiving configuration information for the radio communication device based on the measured reception quality; and determining whether to establish a connection for communication with the second radio communication device based on the stored signal information and the received configuration information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which.

DESCRIPTION

Figure 1:
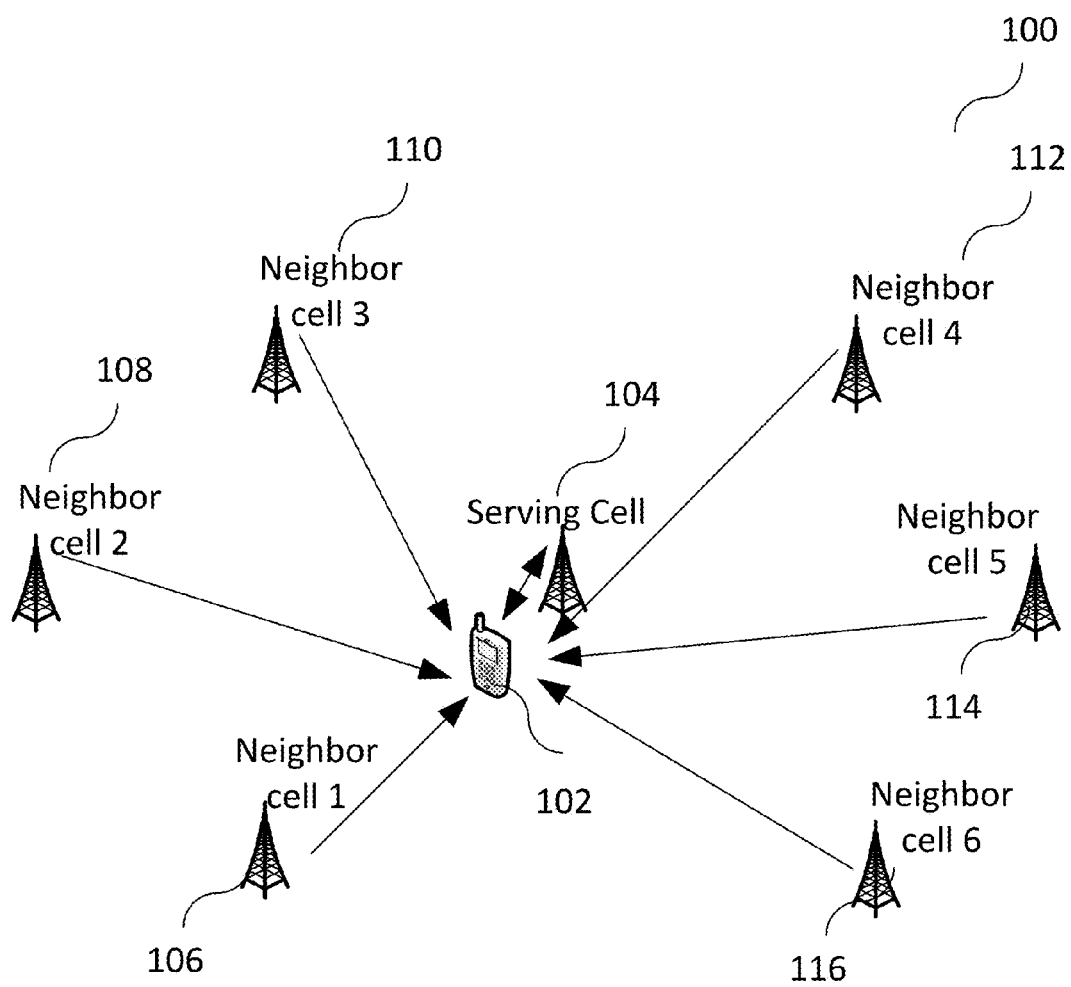
FIG. 1 shows a mobile radio communication system.

The following detailed description refers to the accompanying drawings that show, by way of illustration, specific details and aspects of the disclosure in which the invention may be practiced. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

A radio communication device may be a radio base station or an end-user mobile device (MD). A radio communication device may be any kind of radio communication terminal, mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS), for example in accordance with IEEE 802.16m.

A radio base station may be a radio base station operated by a network operator (which may also be referred to as a legacy base station), e.g. a NodeB or an eNodeB, or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard, for example for IEEE 802.16m.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a communication system 100. A radio communication device 102, which may also be referred to as mobile station, may communicate with a network using a serving cell 104, like indicated by an arrow between the radio communication device 102 and the serving cell. Furthermore, at least one neighbor cell may be provided, and the radio communication device 102 may determine, whether to re-select a neighbor cell as a new serving cell. For example, a first neighbor cell 106 may be provided, and the radio communication device 102 may perform measurements of the first neighbor cell 106, like indicated by an arrow between the first neighbor cell 106 and the radio communication device 102. For example, a second neighbor cell 108 may be provided, and the radio communication device 102 may perform measurements of the second neighbor cell 108, like indicated by an arrow between the second neighbor cell 108 and the radio communication device 102. For example, a third neighbor cell 110 may be provided, and the radio communication device 102 may perform measurements of the third neighbor cell 110, like indicated by an arrow between the third neighbor cell 110 and the radio communication device 102. For example, a fourth neighbor cell 112 may be provided, and the radio communication device 102 may perform measurements of the fourth neighbor cell 112, like indicated by an arrow between the fourth neighbor cell 112 and the radio communication device 102. For example, a fifth neighbor cell 114 may be provided, and the radio communication device 102 may perform measurements of the fifth neighbor cell 114, like indicated by an arrow between the fifth neighbor cell 114 and the radio communication device 102. For example, a sixth neighbor cell 116 may be provided, and the radio communication device 102 may perform measurements of the sixth neighbor cell 116, like indicated by an arrow between the sixth neighbor cell 116 and the radio communication device 102.

Devices and methods may be provided to optimize autonomous cell re-selection in a GSM (Global System for Mobile Communications) cellular network.

The detection of cells belonging to a GSM cellular network may follow a four steps approach. First, the radio communication device (for example the mobile station) may perform reception quality measurements, for example signal strength measurements (for example RSSI (Received Signal Strength Indication) or RXLEV (Reception Level)) on defined frequency carriers. Second, the mobile station may start searching the Frequency Correction Burst (FCB) on the carriers with the highest signal strength. Third, after an FCB has been found, the Mobile Station may able to calculate the position of the Synchronization Burst (SB) and receive it. Fourth, the SB may include or may be the cell identifier and the training sequence code needed to receive the System Information (SI) blocks including or being the configuration information, for example cell configuration.

Based on the configuration information (for example cell configuration), the Mobile Station may detect if the cell belongs to the correct GSM network and get the parameters to calculate the C2 value according to 3GPP TS 45.008 sec. 6.4 needed to consider about re-selection to the new cell based on the actual signal strength of the cell.

The Mobile Station may determine whether to establish a connection for communication with a new cell (in other words: with the second radio communication device), for example to re-select to a new cell, if its C2 values is higher than the C2 value of the cell the Mobile Station is currently camping on for at minimum a predetermined period of time, for example 5 seconds (which may be called T_BETTER_C2 condition below). Goal of this process may be that the Mobile Station is camping on the cell with the highest C2 value belonging to the selected PLMN (Public Land Mobile Network) or an equivalent PLMN and fulfilling the T_BETTER_C2 condition.

However, it may take time to find the FCB, receive the SB and the System Information blocks and that this time delays the re-selection of the Mobile Station to a new "best suitable cell" which may lead into a higher rate of cell re-selections or even into a higher rate of cell losses (for example out-of coverage events) and a lower mobile terminated call setup success rate in a fast moving environment. Devices and methods may be provided for decreasing the time needed to perform the re-selection.

According to commonly used devices and methods, the evaluation of the T_BETTER_C2 timing condition may start earliest after the System Information blocks SI3 (system information block 3) or SI4 (system information block 4) have been received which may include all information needed to calculate the C2 value out of the measured signal strength according to 3GPP TS 45.008 sec. 6.4 and 3GPP TS 44.018 sec. 9.1.35, 9.1.36 and 10.5.2.4.

According to 3GPP TS 45.008 sec. 6.4, the reselection criterion C2 may be defined by:

$$C2=C1+\text{CELL\_RESELECT\_OFFSET}-\text{TEMPORARY\_OFFSET}*H(\text{PENALTY\_TIME}-T) \text{ for PENALTY\_TIME}<>11111,$$

and $$C2=C1-\text{CELL\_RESELECT\_OFFSET}, \text{ for PENALTY\_TIME}=11111.$$

For non-serving cells, H(x) may be defined as follows:

$$H(x)=0 \text{ for } x<0$$

$$=1 \text{ for } x\geq 0.$$

For serving cells, H(x) may be defined as follows: H(x)=0.

C1 may be a path loss criterion parameter according to 3GPP.

T may be a timer implemented for each cell in the list of strongest carriers (for example like in subclause 6.6.1 of the 3GPP standard). T may be started from zero at the time the cell is placed by the MS on the list of strongest carriers, except when the previous serving cell is placed on the list of strongest carriers at cell reselection. In this, case, T may be set to the value of PENALTY_TIME (i.e. expired).

CELL_RESELECT_OFFSET may apply an offset to the C2 reselection criterion for that cell.

It is to be noted that CELL_RESELECT_OFFSET may be used to give different priorities to different bands when multi-band operation is used.

TEMPORARY_OFFSET may apply a negative offset to C2 for the duration of PENALTY_TIME after the timer T has started for that cell.

PENALTY_TIME may be the duration for which TEMPORARY_OFFSET applies The all ones bit pattern on the PENALTY_TIME parameter may be reserved to change the sign of CELL_RESELECT_OFFSET and the value of TEMPORARY_OFFSET may be ignored as indicated by the equation defining C2.

CELL_RESELECT_OFFSET, TEMPORARY_OFFSET and PENALTY_TIME may be optionally broadcast on the BCCH of the cell. If not broadcast, the default values may be C2=C1. The use of C2 may further be as described in 3GPP TS 43.022.

These parameters may be used to ensure that the MS is camped on the cell with which it has the highest probability of successful communication on uplink and downlink.

This procedure may cause a delay of the start of T_BETTER_C2 timing condition of up to more than 700 ms, because of the periodicity with which SI3 and SI4 are broadcasted by the cell according to 3GPP TS 45.002 sec. 6.3.1.3, which might be extended to the size of a DRX (Discontinuous Reception) period in case that the DRX period is larger than the time until SI3 or SI4 is transmitted.

For example, in most cases, start of the T_BETTER_C2 timing condition may be delayed by 1 to 1.5 seconds.

This delay may cause cell losses and "bad" cell re-selections, because the C2 value may be heavily impacted by the reselection offsets contained in S3 and SI4 and a cell with lower signal strength may easily be the preferred cell to re-select to, just because of these offsets. This may cause problems especially if the Mobile Station operates in a quickly changing environment or in a network structure including small micro cells (with high signal strength) and large overlapping umbrella cells (with lower signal strength). "Bad" cell re-selections may cause a higher rate of cell-reselections, which may increase power consumption and may decrease stand-by time of the Mobile Station. Cell losses because of "bad" re-selections may cause a lower success rate for mobile terminated call setups.

Figure 2:
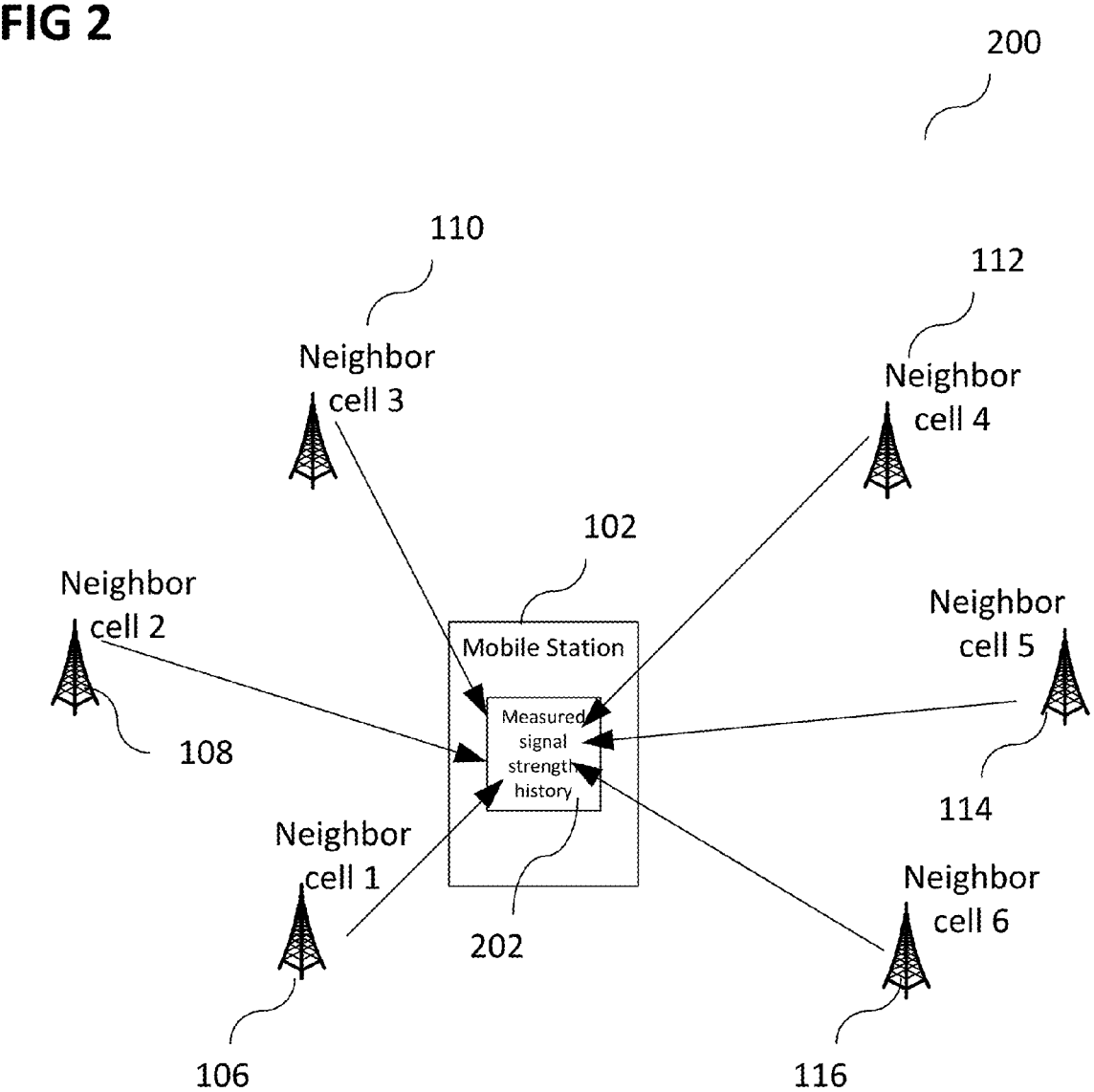
FIG. 2 shows a mobile radio communication system with a mobile station having a measured signal strength history.

FIG. 2 shows a communication system 200. Various parts of the communication system 200 may be similar or identical to the communication system 100 of FIG. 1, and duplicate description may be omitted. In the mobile station 102, a memory 202 for a measured signal strength history (in other words: a storage configured to store signal information indicating the reception quality of the signal measured by a measurement circuit; wherein the measurement circuit of the mobile station may be configured to measure a reception quality of a signal from a second radio communication device, for example from a neighbor cell) may be provided.

Devices (for example a radio communication device, or a mobile station) and methods may be provided which solve the problem of a long time required for re-selection by storing the measured signal strength values for the predetermined period of time, for example 5 seconds, needed to evaluate the T_BETTER_C2 timing condition or longer and calculate back the ideal starting time for the T_BETTER_C2 timing condition after the Mobile Station has received SI3 or SI4 and the condition to start the T_BETTER_C2 timing condition is fulfilled. The T_BETTER_C2 timing condition may then be evaluated from the point in time where the calculated C2 value of the neighbor cell is above the C2 value of the serving cell and cell re-selection may be triggered immediately if the criteria had been fulfilled already for the predetermined period of time, for example 5 seconds, or longer.

Hence the T_BETTER_C2 timing condition may be evaluated from the point in time where the C2 criterion is fulfilled, independent from the reception of SI3 or SI4.

This may allow the Mobile Station to choose the right cell to re-select to without being impacted by time needed to find FCB, receive SB and SI3 or SI4 scheduled in the cell.

In addition, the stored signal strength values may be used to filter out a temporary failure to decode the SB within the configured runtime of T_BETTER_C2.

Devices and methods may be provided for decoupling the evaluation of the T_BETTER_C2 timing condition from the knowledge of the cell identifier and the re-selection offset contained in SI3 or SI4.

Devices (for example radio communication devices or mobile stations) and methods may be provided for storing the measured signal strength values of all configured neighbor cell frequencies for a pre-determined time, for example for five seconds. The Mobile Station may search FCB on the frequencies having the strongest signal strength level, may receive the SB after successfully found the FCB and may receive SI3 or SI4 after successfully received the SB. Configured neighbor cell frequencies may be the frequencies configured by system information contents received on the current serving cell. The configured neighbor cell frequencies may be the frequencies where the mobile performs signal strength measurements, search for FCB, receive SB and system information when a carrier enters the set of (for example 6) strongest cells (for example in a GSM network).

After having received SI3 or SI4, the mobile station may calculate the C2 values and may check if it is higher than the C2 value of the current SCELL (C2 criterion is fulfilled). If so, the mobile station may check how long the C2 criterion for the new cell has been fulfilled already using the stored measured signal strength values and may subtract this from the overall required time, for example from the five seconds time frame.

If the C2 criterion is fulfilled, but not fulfilled for the pre-determined time (for example 5 seconds) already, the T_BETTER_C2 timing condition is evaluated for the remaining time only. If the criterion is already fulfilled for the pre-determined time (for example 5 seconds) and the last SB reception was successful, the mobile station may re-select immediately to the new cell if its C2 value is the highest of all cells fulfilling the T_BETTER_C2 timing condition. If the criterion is not fulfilled or the last SB reception has been failed, no re-selection may happen until SB has been received again and the criterion has been fulfilled for the pre-determined period of time (for example 5 seconds) and the C2 value is the highest of all cells fulfilling the T_BETTER_C2 timing condition (or criterion).

Devices (for example radio communication devices or mobile stations) and methods may be provided acting as described above but storing the measured signal strength values for all configured neighbor cell frequencies for a time longer than the pre-determined time period (for example longer than 5 seconds).

Devices (for example radio communication devices or mobile stations) and methods may be provided for acting as described above, but filtering out a temporary fail to decode the SB within the pre-determined period of time (for example within 5 seconds).

Devices (for example radio communication devices or mobile stations) and methods may be provided for acting as described above, but storing only the measured signal strength values of a pre-determined subset of neighbor cells, for example of the 6 to 12 strongest configured neighbor cell frequencies.

Devices (for example radio communication devices or mobile stations) and methods may be provided for acting as described above but storing only the measured signal strength values of a pre-determined number (for example six) strongest configured neighbor cell frequencies where the last SB reception was successful and up to a pre-determined number (for example six) strongest configured neighbor cell frequencies where the last SB reception has been failed or no SB has been received yet.

Figure 3:
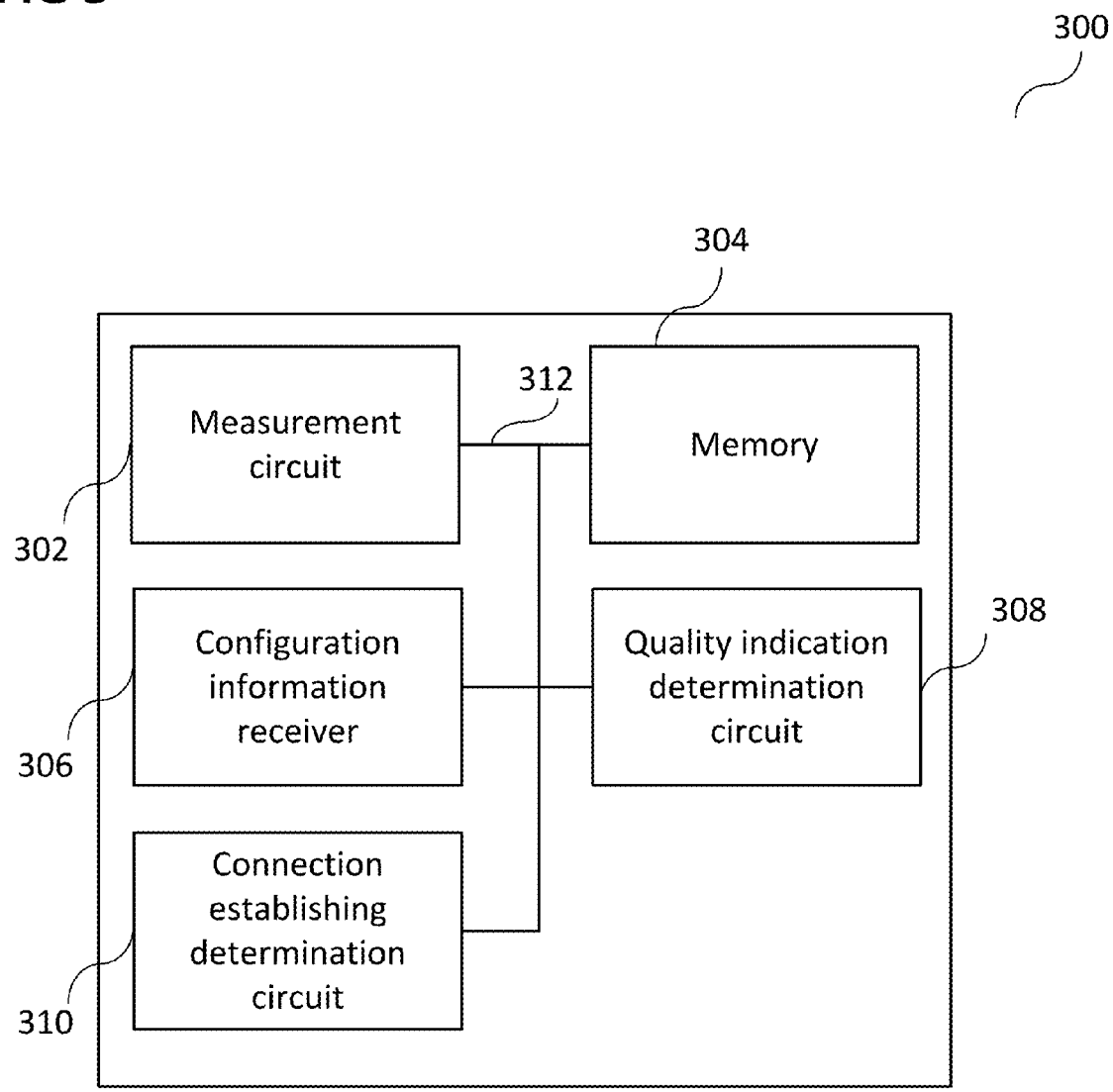
FIG. 3 shows a radio communication device with a measurement circuit, a memory, a configuration information receiver, a quality indication circuit, and a connection establishing determination circuit.

FIG. 3 shows a radio communication device 300. The radio communication device 300 may include a measurement circuit 302 configured to measure a reception quality of a signal from a second radio communication device (not shown). The radio communication device 300 may further include a memory 304 configured to store signal information indicating the reception quality of the signal measured by the measurement circuit 302. The radio communication device 300 may further include a configuration information receiver 306 configured to receive configuration information for the radio communication device 300 based on the measured reception quality. The radio communication device 300 may further include a quality indication determination circuit 308 configured to determine a quality indication of a communication with the second radio communication device based on the stored signal information and the received configuration information. The radio communication device 300 may further include a connection establishing determination circuit 310 configured to determine whether to establish a connection for communication with the second radio communication device based on the determined quality indication. The measurement circuit 302, the memory 304, the configuration information receiver 306, the quality indication determination circuit 308, and the connection establishing determination circuit 310 may be coupled with each other, for example via a connection 312, for example an optical connection or an electrical connection, such as for example a cable or a computer bus or via any other suitable electrical connection to exchange electrical signals.

The reception quality may include or may be a signal strength.

Figure 4:
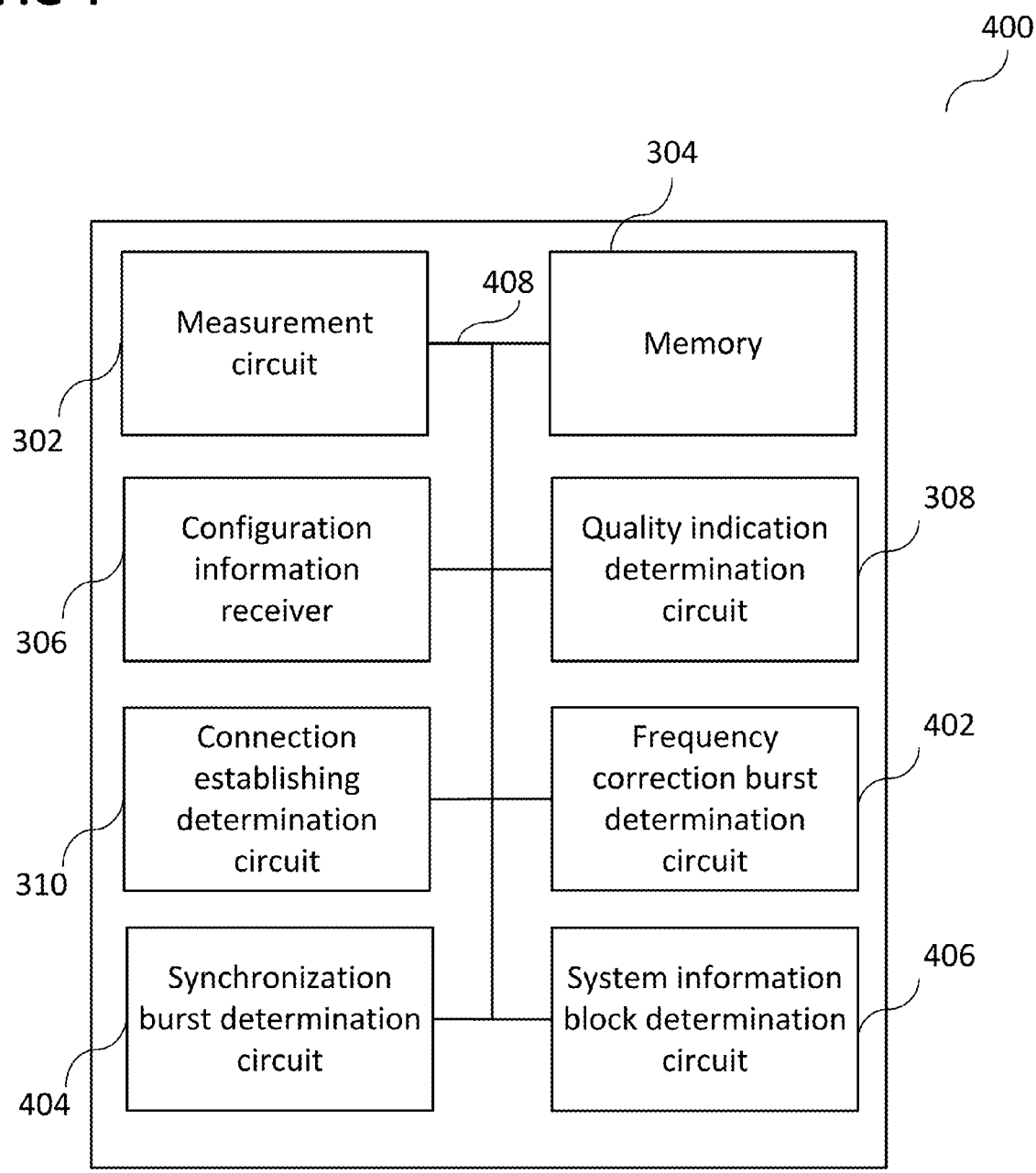
FIG. 4 shows a radio communication device with a measurement circuit, a memory, a configuration information receiver, a quality indication circuit, a connection establishing determination circuit, a frequency correction burst determination circuit, a synchronization burst determination circuit, and a system information block determination circuit.

FIG. 4 shows a radio communication device 400. The radio communication device 400 may, similar to the radio communication device 300 of FIG. 3, include a measurement circuit 302. The radio communication device 400 may, similar to the radio communication device 300 of FIG. 3, further include a memory 304. The radio communication device 400 may, similar to the radio communication device 300 of FIG. 3, further include a configuration information receiver 306. The radio communication device 400 may, similar to the radio communication device 300 of FIG. 3, further include a quality indication determination circuit 308. The radio communication device 400 may, similar to the radio communication device 300 of FIG. 3, further include a connection establishing determination circuit 310. The radio communication device 400 may further include a frequency correction burst determination circuit 402, like will be described in more detail below. The radio communication device 400 may further include a synchronization burst determination circuit 404, like will be described in more detail below. The radio communication device 400 may further include a system information block determination circuit 406, like will be described in more detail below. The measurement circuit 302, the memory 304, the configuration information receiver 306, the quality indication determination circuit 308, the connection establishing determination circuit 310, the frequency correction burst determination circuit 402, the synchronization burst determination circuit 404, and the system information block determination circuit 406 may be coupled with each other, for example via a connection 408, for example an optical connection or an electrical connection, such as for example a cable or a computer bus or via any other suitable electrical connection to exchange electrical signals.

The frequency correction burst determination circuit 402 may determine a frequency correction burst based on the measured reception signal.

The synchronization burst determination circuit 404 may determine a synchronization burst based on the determined frequency correction burst.

The system information block determination circuit 406 may determine a system information block based on the determined synchronization burst. For example, in a GSM network, system information blocks may only be received based on the information contained in the synchronization burst (SB) belonging to the same cell. The frequency correction burst (FCB) may be not sufficient and may only be needed to calculate the position where the SB can be received.

The configuration information receiver 306 may receive the configuration information for the radio communication device based on the system information block.

The connection establishing determination circuit 310 may determine a threshold for re-selecting another cell based on the configuration information. For example, the configuration information may include all parameters needed to calculate the signal level and time thresholds required to determine whether to establish connection or not.

The connection establishing determination circuit 310 may determine whether to establish a connection based on whether the determined quality indication fulfills a pre-determined criterion for a pre-determined time.

The pre-determined time may include or may be a time during which the configuration information is not available in the radio communication device 400.

The second radio communication device may include or may be a radio base station.

The radio communication device 400 may include or may be a mobile radio communication device.

Figure 5:
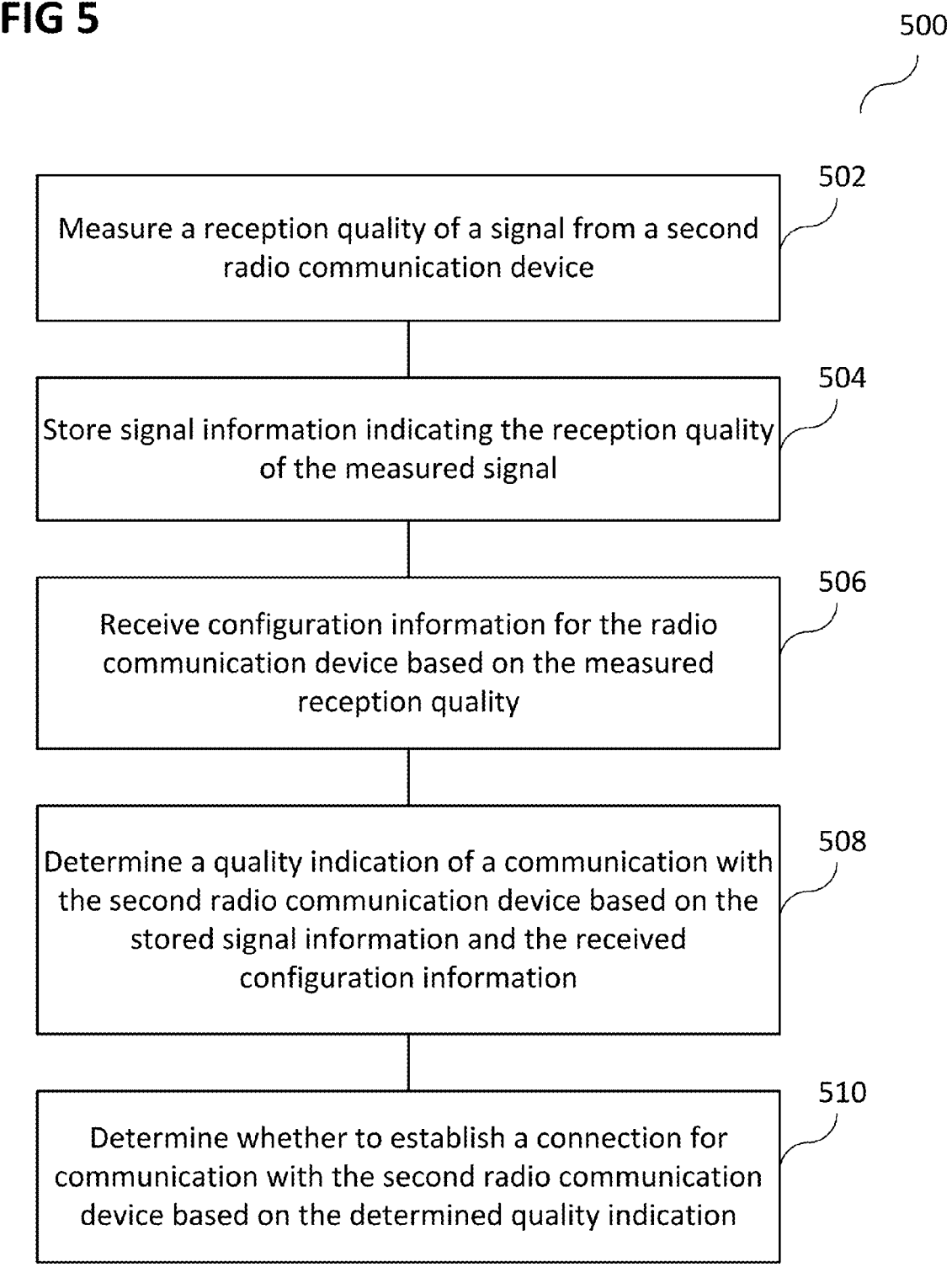
FIG. 5 shows a flow diagram illustrating a method for controlling a radio communication device, for example the radio communication device of FIG. 3.

FIG. 5 shows a flow diagram 500 illustrating a method for controlling a radio communication device. In 502, a measurement circuit of the radio communication device may measure a reception quality of a signal from a second radio communication device. In 504, a memory of the radio communication device may store signal information indicating the reception quality of the measured signal. In 506, a configuration information receiver of the radio communication device may receive configuration information for the radio communication device based on the measured reception quality. In 508, a quality indication determination circuit of the radio communication device may determine a quality indication of a communication with the second radio communication device based on the stored signal information and the received configuration information. In 510, a connection establishing determination circuit of the radio communication device may determine whether to establish a connection for communication with the second radio communication device based on the determined quality indication.

The reception quality may include or may be a signal strength.

The method may further include determining a frequency correction burst based on the measured reception signal.

The method may further include determining a synchronization burst based on the determined frequency correction burst.

The method may further include determining a system information block based on the determined synchronization burst.

The method may further include receiving the configuration information for the radio communication device based on the system information block.

The connection establishing determination circuit may determine a threshold for re-selecting another cell based on the configuration information. For example, the configuration information may include all parameters needed to calculate the signal level and time thresholds required to determine whether to establish connection or not.

The method may further include determining whether to establish a connection based on whether the determined quality indication fulfills a pre-determined criterion for a pre-determined time.

The pre-determined time may include or may be a time during which the configuration information is not available in the radio communication device.

The second radio communication device may include or may be a radio base station.

The radio communication device may include or may be a mobile radio communication device.

Figure 6:
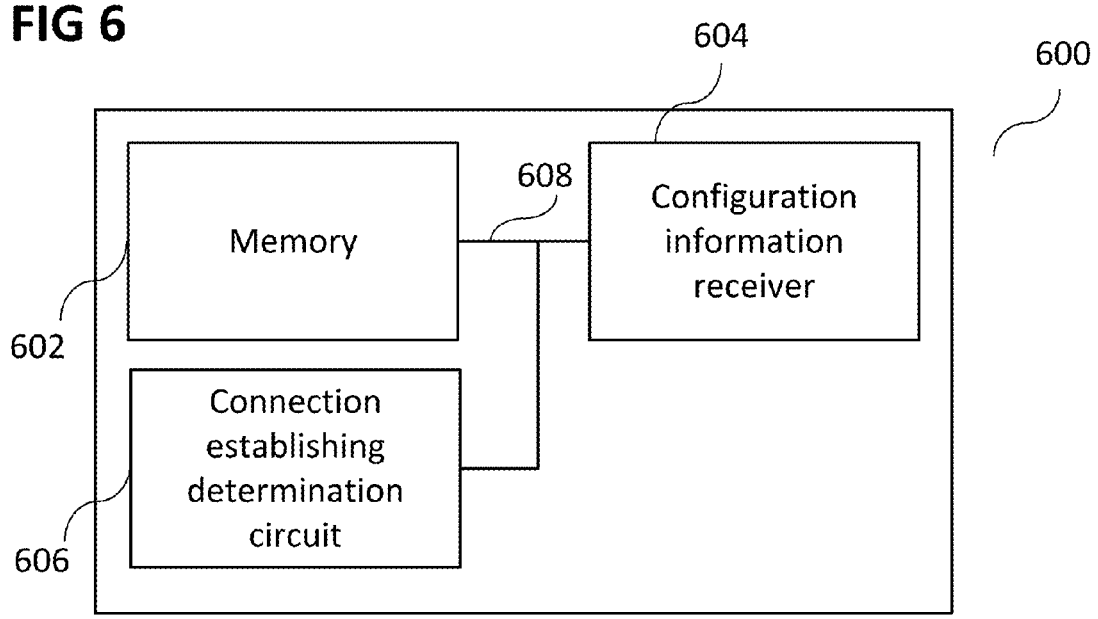
FIG. 6 shows a radio communication device with a memory, a configuration information receiver, and a connection establishing determination circuit.

FIG. 6 shows a radio communication device 600. The radio communication device 600 may include a memory 602 configured to store signal information indicating a measured reception quality of a signal from a second radio communication device (not shown). The radio communication device 600 may further include a configuration information receiver 604 configured to receive configuration information for the radio communication device based on the measured reception quality. The radio communication device 600 may further include a connection establishing determination circuit 606 configured to determine whether to establish a connection for communication with the second radio communication device based on the stored signal information and the received configuration information. The memory 602, the configuration information receiver 604, and the connection establishing determination circuit 606 may be coupled with each other, for example via a connection 608, for example an optical connection or an electrical connection, such as for example a cable or a computer bus or via any other suitable electrical connection to exchange electrical signals.

The configuration information receiver 604 may receive the configuration information in at least one system information block.

Figure 7:
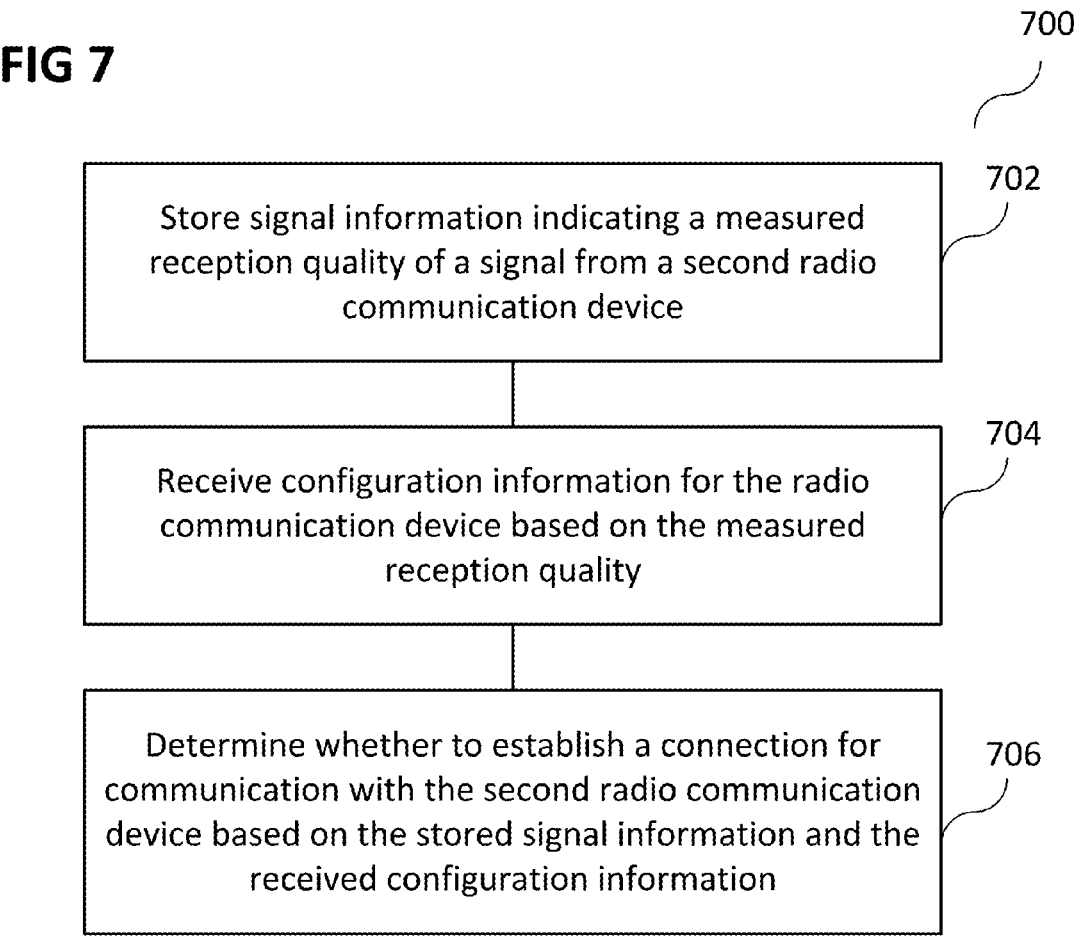
FIG. 7 shows a flow diagram illustrating a method for controlling a radio communication device, for example the radio communication device of FIG. 6.

FIG. 7 shows a flow diagram illustrating a method for controlling a radio communication device. In 702, a memory of the radio communication device may store signal information indicating a measured reception quality of a signal from a second radio communication device. In 704, a configuration information receiver memory of the radio communication device may receive configuration information for the radio communication device based on the measured reception quality. In 706, a connection establishing determination circuit memory of the radio communication device may determine whether to establish a connection for communication with the second radio communication device based on the stored signal information and the received configuration information.

The method may include receiving the configuration information in at least one system information block.

Devices and methods may be provided so that the UE receives the information to finally calculate the timing and signal level thresholds to re-select to another cell within the system information blocks received on the "other" cell. It will be understood that these thresholds may be calculated in various ways.

Any one of the radio communication devices described above may be configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), DataTAC, iDEN (Integrated Digital Enhanced Network), PDC (Personal Digital Cellular), PHS (Personal Handyphone System), WiDEN (Wideband Integrated Digital Enhanced Network), iBurst, Unlicensed Mobile Access (UMA, also referred to as 3GPP Generic Access Network, or GAN standard).

Devices and methods alternative to the devices and methods described above may trigger search for FCB, reception of SB and SI3 or SI4 already before the rising signal strength measured on a carrier frequency reaches the set of the (for example six) strongest cells and to make sure that the reselection offsets contained in SI3 or SI4 already known when the carrier enters the (for example strongest) cell. This may also avoid "bad" re-selections, but may cause a higher power consumption in a quickly changing environment when the carrier does not enter the (for example six) strongest cells afterwards and may not provide the opportunity to filter out temporary SB reception fails.

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising:
   a measurement circuit configured to measure signal strength of a signal from a second radio communication device;
   a memory configured to store a plurality of the measurements of signal strengths over a predefined period of time;
   a configuration information receiver configured to receive configuration information for the radio communication device based on the measured signal strength;
   a quality indication determination circuit configured to determine a quality indication of a communication with the second radio communication device based on at least one of the plurality of measurements of signal strengths and the received configuration information; and
   a connection establishing determination circuit configured to determine whether to establish a connection for communication with the second radio communication device based on the determined quality indication, a timing condition, and the stored plurality of measurements of signal strength; and
   the connection establishing determination circuit further configured to modify the timing condition based on the stored plurality of measurements of signal strengths and the received configuration information.

2. The radio communication device of claim 1, further comprising:
   a frequency correction burst determination circuit configured to determine a frequency correction burst based on the measured reception signal.

3. The radio communication device of claim 2, further comprising:
   a synchronization burst determination circuit configured to determine a synchronization burst based on the determined frequency correction burst.

4. The radio communication device of claim 3, further comprising:
   a system information block determination circuit configured to determine a system information block based on the determined synchronization burst.

5. The radio communication device of claim 4,
   wherein the configuration information receiver is further configured to receive the configuration information for the radio communication device based on the system information block.

6. The radio communication device of claim 1,
   wherein the connection establishing determination circuit determines a threshold for re-selecting another cell based on the configuration information.

7. The radio communication device of claim 1,
   the connection establishing determination circuit configured to determine whether to establish a connection based on whether the determined quality indication fulfills a pre-determined criterion for a pre-determined time.

8. The radio communication device of claim 7,
wherein the pre-determined time comprises a time during which the configuration information is not available in the radio communication device.

9. The radio communication device of claim 1,
wherein the second radio communication device comprises a radio base station.

10. The radio communication device of claim 1,
wherein the radio communication device comprises a mobile radio communication device.

11. A method for controlling a radio communication device, the method comprising:
measuring a measurement of signal strength of a signal from a second radio communication device;
storing a plurality of said measurements over a predefined period of time;
receiving configuration information for the radio communication device based on the measured signal strength;
determining a quality indication of a communication with the second radio communication device based on at least one measurement of signal strength and the received configuration information; and
determining whether to establish a connection for communication with the second radio communication device based on the determined quality indication, a timing condition, and the stored plurality of measurements of signal strength; and
modifying the timing condition based on the stored plurality of measurements of signal strengths and the received configuration information.

12. The method of claim 11, further comprising:
determining a frequency correction burst based on the measured signal strength.

13. The method of claim 12, further comprising:
determining a synchronization burst based on the determined frequency correction burst.

14. The method of claim 13, further comprising:
determining a system information block based on the determined synchronization burst.

15. The method of claim 14, further comprising:
receiving the configuration information for the radio communication device based on the system information block.

16. The method of claim 11, further comprising:
determining a threshold for re-selecting another cell based on the configuration information.

17. The method of claim 11, further comprising:
determining whether to establish a connection based on whether the determined quality indication fulfills a pre-determined criterion for a pre-determined time.

18. The method of claim 17,
wherein the pre-determined time comprises a time during which the configuration information is not available in the radio communication device.

19. The method device of claim 11,
wherein the second radio communication device comprises a radio base station.

20. A radio communication device comprising:
a memory configured to store a plurality of measurements of signal strength of a signal over a predefined period of time from a second radio communication device;
a configuration information receiver configured to receive configuration information for the radio communication device based on the measured signal strength; and
a connection establishing determination circuit configured to determine whether to establish a connection for communication with the second radio communication device based on the stored plurality of measurements of signal strength, at least one current measurement of signal strength, the received configuration information, and a timing condition, the connection establishing determination circuit further configured to modify the timing condition based on the stored plurality of measurements of signal strengths and the received configuration information.

21. The radio communication device of claim 20,
The configuration information receiver further configured to receive the configuration information in at least one system information block.

22. A method for controlling a radio communication device, the method comprising:
storing a plurality of measurements of signal strength of a signal over a predefined period of time from a second radio communication device;
receiving configuration information for the radio communication device based on the measured signal strength;
determining whether to establish a connection for communication with the second radio communication device based on the stored plurality of measurements of signal strength, at least one current measurement of signal strength, the received configuration information, and a timing condition; and
modifying the timing condition based on the stored plurality of measurements of signal strengths and the received configuration information.

23. The method of claim 22, further comprising:
receiving the configuration information in at least one system information block.

24. The radio communication device of claim 1,
wherein the quality indication determination circuit is configured to determine a quality indication of a communication with the second radio communication device based on at least one current measurement of signal strength and the received configuration information.

25. The radio communication device of claim 1,
wherein the quality indication determination circuit is configured to determine a quality indication of a communication with the second radio communication device based on at least one stored measurement of signal strength and the received configuration information.

26. The method of claim 11,
wherein determining the quality indication of a communication with the second radio communication device is based on at least one current measurement of signal strength and the received configuration information.

27. The method of claim 11,
wherein determining the quality indication of a communication with the second radio communication device is based on at least one stored measurement of signal strength and the received configuration information.

28. The method of claim 1,
wherein the connection establishing determination circuit modifies the timing condition by ascertaining a period of time based on the stored plurality of measurements of signal strengths and the received configuration information and applies the ascertained period of time to the timing condition.

29. The method of claim 28,
wherein the ascertained period of time comprises an ideal starting time the determined quality indication fulfilled a threshold ascertained from the stored plurality of measurements of signal strengths and the received configuration information.

* * * * *